United States Patent [19]

Harris

[11] 4,005,170

[45] Jan. 25, 1977

[54] PREPARATION OF PELLETIZED CARBON BLACKS

[75] Inventor: Howard R. Harris, Morgan City, La.

[73] Assignee: Cabot Corporation, Boston, Mass.

[22] Filed: Oct. 16, 1975

[21] Appl. No.: 622,981

Related U.S. Application Data

[63] Continuation of Ser. No. 397,236, Sept. 14, 1973, abandoned, which is a continuation-in-part of Ser. No. 199,030, Nov. 15, 1971, abandoned.

[52] U.S. Cl. .............................................. 264/117
[51] Int. Cl.² ........................................... B01J 2/12
[58] Field of Search .................................... 264/117

[56] References Cited

UNITED STATES PATENTS

| | | | |
|---|---|---|---|
| 3,333,038 | 7/1967 | Walenciak | 264/117 |
| 3,406,426 | 10/1968 | Pobst, Jr. et al. | 264/117 |

*Primary Examiner*—Robert F. White
*Assistant Examiner*—James R. Hall
*Attorney, Agent, or Firm*—Kenneth W. Brown; Lawrence A. Chaletsky; Barry R. Blaker

[57] ABSTRACT

A wet pelletizing process for preparing improved carbon black pellets having controlled size, uniformity and bulk handling properties, wherein fluffy carbon black is intimately mixed with a portion of the liquid medium required for pellet formation prior to adding the remainder of the liquid medium during pelletization.

4 Claims, No Drawings

PREPARATION OF PELLETIZED CARBON BLACKS

This application is a continuation of application Ser. No. 397,236, filed Sept. 14, 1973, now abandoned, which is a continuation-in-part of U.S. application Ser. No. 199,030 filed Nov. 15, 1971 and now abandoned.

This invention relates to a process for the preparation of carbon black suitable for use in inks, rubbers and plastics. More particularly, this invention relates to an improved wet pelletizing process for preparing carbon blacks in pelletized form which are characterized by smaller than conventional pellet size, high density, uniformity of pellet size, superior bulk handling properties and good resistance to attrition.

As is well known in the art, carbon blacks are produced in an extremely finely divided or fluffy form. Normally, it is not only quite suitable but also it is very desirable to convert the finely divided carbon black to a free-flowing pelletized form in order to permit inexpensive and convenient handling, storing and shipping of the blacks. Many methods utilizing dry or wet conditions for converting the individual particles of colloidal carbon into the pelleted form are known to the art. For example, in one dry pelletization method, the dry fluffy blacks are agitated in such a manner as to reduce the quantity of air or other gases associated with the blacks and cause a degree of agglomeration of the discrete particles of the blacks. While the dry pelletization procedures have been successfully utilized in the conversion of fluffy carbon blacks made by an impingement or channel process into pelleted blacks having the desired bulk handling, strength and free flow properties, this has not generally been the case for fluffy blacks produced by the furnace process. Generally, the processes utilized for pelletizing carbon blacks prepared by furnace techniques involve agitating fluffy carbon black in a wet pelletizer in the presence of sufficient liquid pelletizing medium, such as water or a dilute aqueous solution of a binder, to permit agglomeration of the individual particles of colloidal carbon into free-flowing pellets of suitable structural strength and stability. With regard to the dilute aqueous binder solutions that are useful as pelletizing liquids, more information is readily found in U.S. Pat. No. 2,850,403. It is well known from this patent and other prior art that the use of minor amounts of carbonizable carbohydrates, such as amounts of from 0.1 to 0.4% by weight of the black, which will dissolve in water as binders improve the wet pelletizing procedure. Exemplary materials disclosed include sugar, molasses, dextrin, starch and the like. Unfortunately, however, in spite of the availability of many processes for accomplishing pelletization, especially wet pelletization, the preparation of carbon black pellets has been a continuous problem in the carbon black industry. In particular, the presently known pelletization processes are not completely satisfactory in producing carbon black pellets of uniform strength and uniform size. Moreover, the presently available carbon black pelletizing techniques yield pellets which disadvantageously are characterized by poor bulk flow and bulk handling properties. It is, therefore, desirable that a suitable pelletization process permit the preparation of pelleted carbon blacks in a manner affording control with respect to size, uniformity and bulk handling properties of the carbon black pellets.

Accordingly, it is a primary object of this invention to provide a novel and improved wet pelletization process for the preparation of pelleted carbon blacks in which the attendant disadvantages of the prior art are eliminated.

A more specific object of this invention is to provide a process for pelletizing carbon blacks wherein the size, uniformity and bulk handling properties of the blacks are controlled.

A further object of this invention is to provide an improved wet pelletization process for preparing pelletized carbon blacks wherein the required amount of pelletizing liquid is reduced whereby the throughput capacity of the drying portion of the process is increased substantially.

Other and different objects, advantages and features of the present invention will become apparent to those skilled in the art upon consideration of the following detailed description and claims.

In accordance with this invention, it has been found that the above and still further objects are achieved by the utilization of an improved wet pelletizing process for preparing carbon black pellets wherein fluffy carbon black is agitated in a wet pelletizer in the presence of sufficient liquid pelletizing medium, preferably water, to permit agglomeration of the individual particles of colloidal carbon into free-flowing pellets. In particular, the improved process differs from the known prior art techniques in that a portion of the liquid pelletizing medium required for pelletization is intimately mixed with the fluffy carbon black at a high rate of shear as hereinafter defined until a homogeneous mixture is obtained prior to pelletization. As mentioned earlier, a dilute aqueous binder solution may be used in lieu of water as the liquid pelletizing medium.

The method of this invention can be conveniently carried out by intimately admixing, at a high rate of agitation, flocculant, fluffy carbon black with a certain portion of the total amount of pelletizing liquid required for the formation of carbon black pellets prior to adding the remainder of the liquid during pelletization to produce thereby carbon black pellets having a small, uniform size and excellent bulk handling characteristics. More particularly, in the present process, a fluffy carbon black is intimately admixed at a high rate of speed in any suitable mixing apparatus with a portion of the liquid usually required for pellet formation whereupon the size of the resulting carbon black pellets is controlled by varying the amount of liquid utilized. The intimate mixing process of the present invention is found to effectuate a substantial reduction of the amount of large agglomerates and dust accompanying the conventional processes for carbon black formation. The result is achieved by avoiding inadequate mixing which yields, in addition to desirable carbon black pellets, large agglomerates formed from excessively wetted fluffy black and dust formed from fluffy black not moistened.

Generally speaking, the amount of pelletizing liquid required for forming carbon black pellets prior to pelletization may vary greatly. The only consideration is that all of the fluffy carbon black receive at least the minimum amount of liquid required for pellet formation so that upon intimate mixing of the fluffy black and liquid there will not be produced any insufficiently wetted fluffy black to form dust or excessively wetted fluffy black to form large agglomerates. The amount of pelletizing liquid normally utilized ranges from about 3 to about 75 percent of the total amount of liquid required for preparing pellets in a conventional manner. In a preferred embodiment of the present invention, the amount of liquid intimately mixed with the fluffy carbon black prior to pelletization varies from about 10 to about 50 percent of the total amount of liquid required for pellet formation. It is, furthermore, essential for the preparation of carbon black pellets of controlled size that the initial portion of liquid employed be intimately mixed with the fluffy black in a manner so as to permit essentially all of the fluffy black to receive the minimum amount of liquid necessary for pellet formation without the formation of any dust resulting from insufficiently wetted fluffy black or large agglomerates resulting from excessively wetted fluffy black.

The intimate mixing operation, therefore, must be achieved by the utilization of means other than a conventional pelletizer having shaft speed perhaps varying up to 550 revolutions per minute (RPM) since it has been found that agglomerates may exist in such a relatively low impact environment. Indeed, the intimate mixing of the fluffy black and water must be carried out by utilizing suitable means that prevent the formation of large agglomerates such as a high shear blender, hammer mill, micropulverizer or the like wherein the impact environment exceeds that normally existing in conventional pelletizers. Accordingly, for purposes of this process, the intimate mixing is accomplished using any suitable means having an operational rate of shear in excess of 550 revolutions per minute. In a preferred embodiment, a hammer mill or a micropulverizer is used wherein the operational rate of shear varies from about 3500 to about 6500 revolutions per minute.

Representative of the carbon blacks suitable in practicing the process of the present invention are furnace blacks such as semi-reinforcing carbon blacks (SRF), general purpose furnace blacks (GPF), high abrasion furnace blacks (HAF), intermediate super abrasion furnace blacks (ISAF), super abrasion furnace blacks (SAF), fast extruding furnace blacks (FEF) and fine furnace blacks (FF).

The invention will be more readily understood by reference to the following examples which describe the advantageous and unexpected results achieved by the use of the present invention in the preparation of pelleted carbon blacks. There are, of course, many other forms of this invention which will become obvious to one skilled in the art, once the invention has been fully disclosed, and it will accordingly be recognized that these examples are given for the purpose of illustration only and are not to be construed as limiting the scope of this invention in any way.

The following testing procedures are used in evaluating the physical properties and efficiency of the pelleted carbon black products of the present invention.

Pour Density of Pelleted Carbon Black

The pour density of pelleted carbon blacks, expressed in units of pounds per cubic foot, is determined in accordance with ASTM Test Method D-1513-60 with the exception that a cylindrical container having a capacity of 1000 milliliters is employed.

Mass Pellet Strength (Western Electric)

The mass strength of pelleted carbon black is measured in accordance with the technique of ASTM D-1937-62T Method B with one exception. The exception involves tapping the base plate of the Western Electric apparatus ten times in lieu of allowing the weights to remain on the column of black for a period of ten seconds. The mass pellet strength is reported as the first number of pounds required to just produce a ring or bridge of pressed carbon black pellets in the cylinder.

Dust or Fines Content (Five Minute Ro-Tap)

The fines content of pelleted carbon black is determined in accordance with Test Method ASTM D-1508-60 with the exception that the Ro-Tap Sieve Shaker, equipped with U.S. Standard No. 100 (149 micron) sieves is permitted to shake for a period of five minutes only. The fines content of pelleted carbon black is determined from the amount of carbon black retained on the sieve receiver and is calculated to the nearest 0.1 percent.

Pellet Size Distribution

In accordance with the procedure of ASTM Test Method No. D-1511-60, the pellet size distribution of carbon black is determined. In brief, a sieve assembly having U.S. Standard Sieves Nos. 10, 18, 35, 60 and 120 with openings of 2000, 1000, 500, 250 and 125 microns, respectively, stacked in the stated order is subjected to a shaking action on a Ro-Tap Sieve Shaker for a period of one minute. The weight of the carbon black retained on each sieve is obtained and the pellet size distribution of carbon black is calculated to the nearest 0.1 percent as percent retained on each sieve screen.

DBP Absorption

The absorption characteristics of pelleted carbon black are determined in accordance with ASTM No. D-2424-65T. In essence, dibutyl phthalate (DBP) is added to carbon black until a transition from a free-flowing powder to a semiplastic agglomerate results in a sharp increase in viscosity.

EXAMPLE 1

In this example a comparative series of runs are performed using a continuous, conventional pin-type wet pelletizer and a fluffy Vulcan 6H carbon black produced and sold by Cabot Corporation having a tinting strength of 225, an iodine surface area of 100.3 square meters per gram, an iodine number of 125 mg/g, a DPB absorption value of 144.7 cubic centimeters per 100 grams of carbon black and a pour density of 22 pounds per cubic foot. Moreover, for purposes of achieving the degree of intimate mixing required for purposes of the present invention, it is essential that blending means for attaining a rate of shear sufficient to prevent formation of agglomerates be utilized. In this instance, therefore, the blending means employed is a micropulverizer operating at a rate of shear of 4000 revolutions per minute (RPM). As will become apparent from the data in Table I below, varying portions of the total amount of water required for the pelletization procedure are added at the pulverization step of the process with the balance of the water required for pelletization being added at the pelletizer. In this manner the beneficial effects of the intimate mixing technique of the present invention become readily apparent. It should also be noted that in this example no pellet binder of the types described hereinbefore is utilized. Accordingly, the Vulcan 6H carbon black, in a fluffy state, is fed into the micropulverizer at a rate of 380 pounds per hour. The total water required for pelletization is determined to be 0.89 gallons per minute and the portion of the total amount of water injected into the pulverizer is indicated in the following Table I wherein the results obtained are given.

commercial significance is readily apparent, since reduction of the total amount of moisture passing to a dryer increases the throughput of the dryer thereby permitting production rates to be increased where drying rates are a limiting factor. Moreover, it has been

TABLE I

| Sample | A | B | C | D | E |
|---|---|---|---|---|---|
| Percentage of total pelletizing water injected into pulverizer | 0.0 | 11.5 | 23.8 | 40.6 | 50.0 |
| Pelletizer Speed, RPM | 300 | 300 | 300 | 300 | 300 |
| Apparent Density of pellets after drying, lbs/cu.ft. | 19.0 | 20.3 | 20.4 | 21.4 | 21.5 |
| Western Electric crushing strength, lbs. | 45 | 80 | 60 | 105 | 130 |
| −100 mesh fraction from 5′ Ro-Tap, percent | 5.8 | 0.2 | 0.6 | 6.6 | 46.4 |
| Pellet Size Distribution, U.S. sieve, percent | | | | | |
| +10 mesh screen | 0.7 | 0.0 | 0.0 | 0.0 | 0.0 |
| 18 mesh screen | 77.6 | 2.2 | 0.6 | 0.1 | 0.0 |
| 35 mesh screen | 20.0 | 78.8 | 32.8 | 24.6 | 2.4 |
| 60 mesh screen | 1.2 | 18.0 | 59.4 | 53.2 | 27.0 |
| 120 mesh screen | 0.3 | 0.8 | 7.0 | 19.0 | 46.6 |
| −120 mesh screen | 0.2 | 0.2 | 0.2 | 3.1 | 24.0 |

EXAMPLE 2

The procedure of Example 1 wherein carbon black is fed at a rate of 380 pounds per hour into a micropulverizer operated at a rate of shear of 4000 revolutions per minute is followed with the exception that the carbon black employed is a fluffy Vulcan 6 carbon black made and sold by Cabot Corporation having an iodine surface area of 97.5, a DBP absorption of 144.4 cubic centimeters per 100 grams of carbon black, and, in this instance, free of natural extract. As in the prior Example no binder is employed in carrying out the comparative series of runs shown in Table II hereinbelow. Measurements of the flow of water at the pelletizer and pulverizer are made with any suitable conventional means for making such measurements, such as a totalizing meter.

successfully demonstrated herein that the usage of pellet binder can be reduced or possibly even eliminated. Furthermore, it is readily apparent that the present high speed, intimate mixing process results in the preparation of small pellets having a high degree of uniformity.

EXAMPLE 3

A Vulcan 6 carbon black made and sold by Cabot Corporation and having a Nigrometer scale of 87, an iodine number of 125.3, a BET nitrogen surface area of 115 square meters per gram, a DBP absorption of 132.3 cubic centimeters per 100 grams of black, and a tinting strength of 106, is collected from a production unit in a fluffy state. The fluffy black is fed at a rate of 380 pounds per hour to a micropulverizer operating at a rate of shear of 4000 revolutions per minute. The

TABLE II

| Sample | A | B | C | D | E |
|---|---|---|---|---|---|
| Percentage of total pelletizing water injected into pulverizer | 0.0 | 38.8 | 31.8 | 35.2 | 40.5 |
| Pelletizer Speed, RPM | 330 | 330 | 330 | 400 | 530 |
| Apparent Density of pellets after drying, lbs/cu.ft. | 19.7 | 22.0 | 22.3 | 23.0 | 24.2 |
| Western Electric crushing strength, lbs. | 27 | 80 | 80 | 80 | 95 |
| −100 mesh fraction from 5′ Ro-Tap, percent | 7.6 | 2.1 | 12.4 | 21.8 | 5.7 |
| Pellet Size Distribution, U.S. sieve, percent | | | | | |
| +10 mesh screen | 41.6 | 0.9 | 0.8 | 0.4 | 0.4 |
| 18 mesh screen | 48.4 | 4.2 | 5.6 | 6.0 | 2.8 |
| 35 mesh screen | 7.4 | 15.0 | 17.8 | 11.2 | 32.0 |
| 60 mesh screen | 2.0 | 61.2 | 41.8 | 33.2 | 45.6 |
| 120 mesh screen | 0.4 | 17.4 | 28.0 | 36.2 | 16.0 |
| −120 mesh screen | 0.2 | 1.3 | 6.0 | 13.0 | 3.2 |
| Moisture content of pellets percent | 54.0 | 54.2 | 49.2 | 46.4 | 15.8 |

In the data relative to Table II, it can be seen that the total amount of water required for preparing pellets is hereby reduced as a result of the present intimate mixing process. In particular, the amount of water required for preparing the Vulcan 6H carbon black pellets is found to be lower by as much as twenty percent than that required for such pellets prepared by the conventional process when the present process is utilized. The amount of water injected at the micropulverizer is measured by means of a rotameter and the total amount of water required for pelletization which is 0.75 gallons per minute is measured by means of a totalizing meter. The carbon blacks are then passed to a two-pass wet pelletizer having a diameter of 16 inches for pelletization. In order to determine the effects on pellet quality resulting from intimate mixing of carbon black with a portion of the total amount of required pelletizing water prior to completion of the pelletizing operation, three runs, each of 7 hour duration, are performed using varying portions of the total pelletizing water. The results observed are tabulated and reported in the following Table III.

TABLE III

| Sample | A | B | C |
| --- | --- | --- | --- |
| Percentage of total required pelletizing water added at pulverizer | 0 | 14.6 | 22.0 |
| Pelletizer Speed, RPM | 435 | 435 | 435 |
| Western Electric crushing strength, lbs. | 54 | 78 | 82 |
| Apparent Density of pellets (after drying) lbs/cu.ft. | 22.6 | 24.6 | 25.4 |
| Moisture content of pellets, percent | 50.5 | 47.6 | 48.8 |
| Pellet Size Distribution, U.S. sieve, percent | | | |
| +10 mesh screen | | 5.8 | 2.7 | 0.8 |
| 18 mesh screen | 52.9 | 67.8 | 5.2 | |
| 35 mesh screen | 25.5 | 23.6 | 16.9 | |
| 60 mesh screen | 10.6 | 3.7 | 21.8 | |
| 120 mesh screen | 4.1 | 1.7 | 26.7 | |
| −120 mesh screen | 1.1 | 0.5 | 28.6 | |
| Average Pellet Size, inches | 0.05 | 0.05 | 0.02 |

From the above, it is readily apparent that higher Western Electric crushing strength values are obtained on carbon black pellets produced by the process of this invention wherein a portion of the water required for pelletization is intimately mixed with the carbon black in a suitable apparatus operating at a high rate of shear prior to carrying out the pelletizing operation. It is further noted that the present process yields carbon black pellets having a higher density which is valuable commercially as a means for increasing production storage capacity. As in the earlier examples, the results from this series of runs indicate that a reduction in the total amount of water required for preparing good quality carbon black pellets is obtained when utilizing the present process of premixing a portion of the pelletizing water and the carbon black in a suitable device such as a micropulverizer. Furthermore, it should be noted that a carbon black having a significantly smaller average pellet size is obtained as a result of the run employing the high amount of water during the premix operation.

EXAMPLE 4

In this example the effect of intimately mixing a portion of the required pelletizing water with the carbon black prior to pelletization thereof is shown using a Vulcan 6 LM carbon black product made and sold by Cabot Corporation having a tinting strength of 230, an iodine number of 123, an iodine surface area of 98 square meters per gram, and a DBP absorption of 92 cubic centimeters per 100 grams of carbon black. In detail, the Vulcan 6 LM carbon black is collected from a production unit and fed in the fluffy state into a micropulverizer operated at a rate of shear of 6500 revolutions per minute, together with a portion of the total amount of water required for pelletization. The resultant pre-wetted fluffy carbon black is fed by any conventional means such as a feed screw into one end of a pelletizer having a diameter of 20 inches where the remainder of the water necessary for pelletization is added. The data obtained on the series of runs using differing portions of water in the premixing operation are given in Table IV below.

TABLE IV

| Sample | A | B | C |
| --- | --- | --- | --- |
| Vulcan 6 LM carbon black production rate, lbs/day | 78,300 | 63,400 | 69,500 |
| Pelletizer Speed, RPM | 460 | 410 | 460 |
| Water required for pelletization, gals/minute | 5.13 | 4.29 | 4.12 |
| Amount of total water injected at pulverizer, percent | 0.0 | 4.2 | 13.3 |
| Pellet Size Distribution, percent | | | |
| +10 mesh screen | 0.1 | 0.4 | 0.3 |
| 18 mesh screen | 2.1 | 1.8 | 34.5 |
| 35 mesh screen | 37.4 | 30.9 | 56.8 |
| 60 mesh screen | 46.6 | 52.8 | 8.3 |
| 120 mesh screen | 11.2 | 13.3 | 0.2 |
| −120 mesh screen | 2.3 | 0.9 | 0.1 |
| Average pellet size, diameter, inches | 0.038 | 0.021 | 0.019 |
| Western Electric crushing strength, lbs. | 65 | 92 | 94 |
| Apparent Density of pellets (after drying) lbs/cu.ft. | 25.8 | 26.2 | 27.3 |

It is therefore apparent from the foregoing that the use of the intimate mixing process of the present invention results in the production of carbon black pellets having reduced pellet size, increased density, and increased Western Electric crushing strength which, in turn, permit increased bulk storage capacity and reduced pellet binder requirements.

Samples of the carbon black pellets obtained from the three runs set forth in Example 4 are then incorporated into standard natural and synthetic rubber formulations to determine the effects of the present processing conditions on the reinforcing properties of the blacks. For example, the rubber and the carbon black reinforcing agent are intimately admixed together on a conventional mixing machine of the type normally used for mixing rubber or plastics such as a roll mill or a Banbury mixer in order to insure efficient dispersion. The rubber compositions are compounded according to standard industry formulations for both natural rubber and snythetic rubber-containing formulations. The resulting vulcanizates to be tested are cured at 293° F for 30 minutes when natural rubber is used and for 50 minutes when a synthetic rubber, styrene-butadiene rubber in this instance, is employed. In evaluating the performance of the pelleted carbon blacks of the present invention, the following formulations are utilized wherein the quantities are specified in parts by weight.

| Ingredient | Natural Rubber Recipe | Synthetic Rubber Recipe |
| --- | --- | --- |
| Polymer | 100 (Natural Rubber) | 100 (styrene-butadiene) |
| Zinc Oxide | 5 | 5 |
| Sulfur | 2.5 | 2 |
| Stearic Acid | 3 | 1.5 |
| Mercaptobenzothiazyl disulfide | 0.6 | 2 |
| Carbon Black | 50 | 50 |

Utilizing the above formulation the following results are obtained when 50 parts each of Samples A, B and C from Example 4 are compounded into the natural rubber recipe:

| Sample | A | B | C |
| --- | --- | --- | --- |
| Modulus at 300% elongation, lb/sq.in. | 1690 | 1680 | 1700 |
| Tensile, lbs/sq.in. | 4140 | 4220 | 4160 |
| Elongation, percent | 590 | 590 | 560 |
| Shore hardness | 58 | 59 | 58 |

When using 50 parts by weight of each of the carbon black samples of Example 4 in the above styrene-butadiene recipe the following results are obtained:

| Sample | A | B | C |
| --- | --- | --- | --- |
| Extrusion shrinkage, percent | 101.1 | 102.8 | 102.2 |
| Modulus at 300% elongation, lbs/sq.in. | 1810 | 1810 | 1810 |
| Tensile, lbs/sq.in. | 4700 | 4610 | 4710 |

-continued

| Sample | A | B | C |
| --- | --- | --- | --- |
| Elongation, percent | 600 | 580 | 590 |

From the foregoing rubber testing results it is noted that there are no significant differences in the rubber properties of the black as a result of using the intimate mixing process of the present invention. This is especially important in view of the other properties of the pellets which are markedly improved.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. In a process for wet pelletizing carbon black wherein fluffy carbon black is agitated in a pelletizer in the presence of sufficient pelletizing liquid to agglomerate the particles of carbon black into free-flowing pellets, the improvement comprising:
   a. intimately admixing said fluffy carbon black with a portion of about 3 to about 75% of said pelletizing liquid in a mixer having rotational means operating at a speed in excess of 550 r.p.m., and
   b. agitating the resulting wet mixed carbon black with the remaining portion of said pelletizing liquid to agglomerate said carbon black into said free-flowing pellets.

2. The process of claim 1 wherein said pelletizing liquid is water.

3. The process of claim 1 wherein the portion of pelletizing liquid in step (a) is about 10 to about 50% of said pelletizing liquid.

4. The process of claim 1 wherein said rotational means in said mixer is operated at a speed of about 3500 to about 6500 r.p.m.

* * * * *